(12) United States Patent
Wada (10) Patent No.: US 7,636,923 B2
(45) Date of Patent: Dec. 22, 2009

(54) DISK APPARATUS

(75) Inventor: Shinichi Wada, Ehime (JP)

(73) Assignee: Panasonic Corporation, Osaka (JP)

( * ) Notice: Subject to any disclaimer, the term of this patent is extended or adjusted under 35 U.S.C. 154(b) by 750 days.

(21) Appl. No.: 10/585,089

(22) PCT Filed: Jul. 28, 2005

(86) PCT No.: PCT/JP2005/013835

§ 371 (c)(1),
(2), (4) Date: Jun. 30, 2006

(87) PCT Pub. No.: WO2006/027908

PCT Pub. Date: Mar. 16, 2006

(65) Prior Publication Data

US 2009/0178064 A1 Jul. 9, 2009

(30) Foreign Application Priority Data

Sep. 10, 2004 (JP) ............................. 2004-263183

(51) Int. Cl.
*G11B 17/03* (2006.01)
(52) U.S. Cl. ..................................... 720/601
(58) Field of Classification Search ................. 720/601, 720/604, 652, 646, 647, 715, 630, 650, 616, 720/637
See application file for complete search history.

(56) References Cited

U.S. PATENT DOCUMENTS 6,914,358 B2 * 7/2005 Tokunaga et al. ............. 310/90
6,920,013 B2 * 7/2005 Nishimura et al. ....... 360/99.08
2005/0099722 A1 * 5/2005 Nishimura et al. ....... 360/99.08

(Continued)

FOREIGN PATENT DOCUMENTS

| JP | 11-144444 | 5/1999 |
| JP | 2002-50104 | 2/2002 |
| JP | 2002-352498 | 12/2002 |

*Primary Examiner*—Allen T Cao
(74) *Attorney, Agent, or Firm*—Dickinson Wright PLLC (57) ABSTRACT

The present invention provides a disk apparatus capable of obtaining sufficient rigidity and preventing motion failure caused by deformation of a chassis outer sheath even if material having low rigidity such as aluminum alloy or magnesium alloy is used.

A disk apparatus has a chassis outer sheath comprising a base body 10 and a lid 130. A disk inserting opening 11 into which a disk is directly inserted is disposed in a front surface of the chassis outer sheath, a connector 12 is disposed on the rear surface, the base body 10 is provided at its side with a discharging lever 100 which discharges the disk, the base body 10 is provided at its rear surface with a limiting lever 110 which limits the insertion of the disk, a rear base 13 is provided at a location which is not superposed on the traverse 30 and location covering a printed board 14, one of a lower surface of the discharging lever 100 and an upper surface of the rear base 13 is projected to form a discharging lever sliding surface 311 on the rear base 13, one of a lower surface of the limiting lever 110 and the upper surface of the rear base 13 is projected to form limiting lever sliding surfaces 312 and 313 on the rear base 13, and openings are formed in the rear base 13, opposite sides of the discharging lever sliding surface 311 and opposite sides of the limiting lever sliding surfaces 312 and 313.

7 Claims, 5 Drawing Sheets

U.S. PATENT DOCUMENTS

2008/0068744 A1* 3/2008 Nakazawa et al. ....... 360/97.01
2008/0244626 A1* 10/2008 Kirihara et al. ............. 720/601
2008/0271062 A1* 10/2008 Asano et al. ................ 720/601

* cited by examiner

DISK APPARATUS

TECHNICAL FIELD

The present invention relates to a disk apparatus for recording or replaying into or from a disk-like recording medium such as a CD and a DVD, and more particularly, to a so-called slot-in type disk apparatus capable of directly inserting or discharging a disk from or to outside.

BACKGROUND TECHNIQUE

A loading method is widely employed in conventional disk apparatuses. In this method, a disk is placed on a tray or a turntable, and the tray or the turntable is loaded into an apparatus body.

According to such a loading method, however, since the tray or the turntable is required, there is a limit for thinning the disk apparatus body.

As a slot-in type disk apparatus, there is proposed a method in which a conveying roller is abutted against a disk surface to pull the disk in (e.g., a patent document 1).

As a slot-in type disk apparatus capable of reducing its thickness and size, there exists an apparatus in which a traverse is disposed on the side of a disk inserting opening, a printed board is disposed on the side of a connector, a spindle motor is located at a central portion of a base body, a reciprocating range of a pickup is located closer to the disk inserting opening than the spindle motor, the traverse is disposed and operated such that a reciprocating direction of the pickup is different from an inserting direction of the disk, and a spindle motor is disposed close to the base body or a lid (e.g., a patent document 2).

(Patent document 1) Japanese Patent Application Laid-open No. H7-220353

(Patent document 2) Japanese Patent Application Laid-open No. 2002-352498

DISCLOSURE OF THE INVENTION

Problem to be Solved by the Invention

According to the slot-in type as proposed in the patent document 1, however, since a conveying roller which is longer than a diameter of the disk is used, the width of the apparatus must be increased, and the thickness of the apparatus is also increased due to this conveying roller.

Therefore, in the slot-in type disk apparatus, it is difficult to reduce a main body of the disk apparatus in thickness and size.

In the case of the apparatus of the patent document 2, it is possible to reduce its thickness and size, but when a chassis outer sheath is made of aluminum alloy or magnesium alloy in order to reduce its thickness and size, it is necessary to increase the rigidity of the chassis outer sheath.

Hence, it is an object of the present invention to provide a disk apparatus capable of obtaining sufficient rigidity and preventing motion failure caused by deformation of the chassis outer sheath, even if material of low rigidity such as aluminum alloy or magnesium alloy is used.

Means for Solving Problem

A first aspect of the present invention provides a disk apparatus comprising a chassis outer sheath having a base body and a lid, in which a front surface of the chassis outer sheath is formed with a disk inserting opening into which a disk is directly inserted, a connector is disposed on a rear surface of the chassis outer sheath, a traverse is disposed on the side of the disk inserting opening, a printed board is disposed on the side of the connector, the traverse holds a spindle motor, a pickup and drive means which moves the pickup, the spindle motor is disposed at a central portion of the base body, a discharging lever which discharges a disk is provided on a side of the base body, a limiting lever which limits insertion of the disk is provided on the side of a rear surface of the base body, and a rear base is provided at a location which is not superposed on the traverse and at a location covering the printed board, wherein one of a lower surface of the discharging lever and an upper surface of the rear base is projected to form a discharging lever sliding surface on the rear base, one of a lower surface of the limiting lever and the upper surface of the rear base is projected to form a limiting lever sliding surface on the rear base, a plurality of openings are formed in the rear base, and the openings are formed on opposite sides of the discharging lever sliding surface, and the openings are also formed on opposite sides of the limiting lever sliding surface.

According to a second aspect of the invention, in the invention of the first aspect, the openings are formed such that a gross area of the openings is greater than a surface area of the rear base.

According to a third aspect of the invention, in the invention of the first aspect, the base body is formed with a plurality of openings.

According to a fourth aspect of the invention, in the invention of the third aspect, the openings of the base body are formed at a location of the spindle motor.

According to a fifth aspect of the invention, in the invention of the third aspect, the openings are formed such that a gross area of the openings provided in a base body region where the printed board of the base body is disposed is greater than a gross area of the openings provided in the base body region where the printed board of the base body is not disposed.

According to a sixth aspect of the invention, in the invention of the first aspect, the base body is formed with a deep bottom and a shallow bottom, the shallow bottom is disposed on a side of the deep bottom, the shallow bottom includes a connection end which is connected to the deep bottom, an opposed end which is not connected to the deep bottom, and an inclined end which is adjacent to the connection end and the opposed end, the opposed end is formed with a rising portion extending toward the lid, a plurality of shallow bottom side connection pieces extending toward the deep bottom are formed on an upper end of the rising portion, one of the shallow bottom side connection pieces is provided on an end of an opposed end which is connected to the inclined end, the base body and the lid are fastened to each other by the shallow bottom side connection piece a plurality of deep bottom side connection pieces which are parallel to a surface of the deep bottom are formed on an upper end of a sidewall of the deep bottom on the side of its rear surface, one of the deep bottom side connection pieces is provided on a corner on the side of the shallow bottom, and the base body and the lid are fastened to each other by the deep bottom side connection piece.

According to a seventh aspect of the invention, in the invention of the first aspect, a hook which engages the sidewall of the base body on the side of its rear surface is provided on a central portion of the sidewall of the lid on the side of the rear surface, and another hook which engages the sidewall of the base body is provided on a sidewall of the lid on the side of the deep bottom.

EFFECT OF THE INVENTION

According to the present invention, it is possible to secure the rigidity of the chassis outer sheath in terms of structure, and to prevent motion failure caused by deformation of the chassis outer sheath, and to reduce thickness, size and weight of the disk apparatus.

EXPLANATION OF SYMBOLS

10 base body
11 disk inserting opening
30 traverse
130 lid
210 deep bottom
310 shallow bottom

BEST MODE FOR CARRYING OUT THE INVENTION

In a disk apparatus of a first embodiment of the present invention, a lower surface of a discharging lever or an upper surface of a rear base projects to form a discharging lever sliding surface on the rear base, a lower surface of a limiting lever or an upper surface of the rear base projects to form a limiting lever sliding surface on the rear base, a plurality of openings are formed in the rear base, openings are formed in both sides of the discharging lever sliding surface, and openings are also formed in both sides of the limiting lever sliding surface. According to this embodiment, the rear base can be reduced in weight without hindering the sliding motions of the discharging lever and the limiting lever.

According to the second aspect of the invention, in the disk apparatus of the invention of the first aspect, the openings are formed such that a gross area of the openings is greater than a surface area of the rear base. With this aspect, the weight of the rear base can be reduced by half.

According to the third aspect of the invention, in the disk apparatus of the invention of the first aspect, the base body is formed with a plurality of openings. With this aspect, by providing the base body with the openings also, it is possible to reduce the chassis outer sheath in weight.

According to the fourth aspect of the invention, in the disk apparatus of the invention of the third aspect, the openings of the base body are formed at a location of the spindle motor. With this aspect, the weight of the disk apparatus can be reduced. The spindle motor must secure the height direction, but since a portion of the spindle motor can project toward the base body, the chassis outer sheath can also be reduced in thickness.

According to the fifth aspect of the invention, in the disk apparatus of the invention of the third aspect, the openings are formed such that a gross area of the openings provided in a base body region where the printed board of the base body is disposed is greater than a gross area of the openings provided in the base body region where the printed board of the base body is not disposed. With this aspect, the openings of the base body on the side of the traverse are reduced and thus, it is possible to prevent dust from entering the pickup and to reduce the base body in weight.

According to the sixth aspect of the invention, in the disk apparatus of the invention of the first aspect, the base body is formed with a deep bottom and a shallow bottom, the shallow bottom is disposed on a side of the deep bottom, the shallow bottom includes a connection end which is connected to the deep bottom, an opposed end which is not connected to the deep bottom, and an inclined end which is adjacent to the connection end and the opposed end, the opposed end is formed with a rising portion extending toward the lid, a plurality of shallow bottom side connection pieces extending toward the deep bottom are formed on an upper end of the rising portion, one of the shallow bottom side connection pieces is provided on an end of an opposed end which is connected to the inclined end, the base body and the lid are fastened to each other by the shallow bottom side connection piece a plurality of deep bottom side connection pieces which are parallel to a surface of the deep bottom are formed on an upper end of a sidewall of the deep bottom on the side of its rear surface, one of the deep bottom side connection pieces is provided on a corner on the side of the shallow bottom, and the base body and the lid are fastened to each other by the deep bottom side connection piece. With this aspect, the rigidity of the shallow bottom can be enhanced.

According to the seventh aspect of the invention, in the disk apparatus of the invention of the first aspect, a hook which engages the sidewall of the base body on the side of its rear surface is provided on a central portion of the sidewall of the lid on the side of the rear surface, and another hook which engages the sidewall of the base body is provided on a sidewall of the lid on the side of the deep bottom. With this aspect, it is possible to prevent the lid from floating at the time of chucking.

PREFERRED EMBODIMENT

A disk apparatus of an embodiment of the present invention will be explained below.

Figure 1:
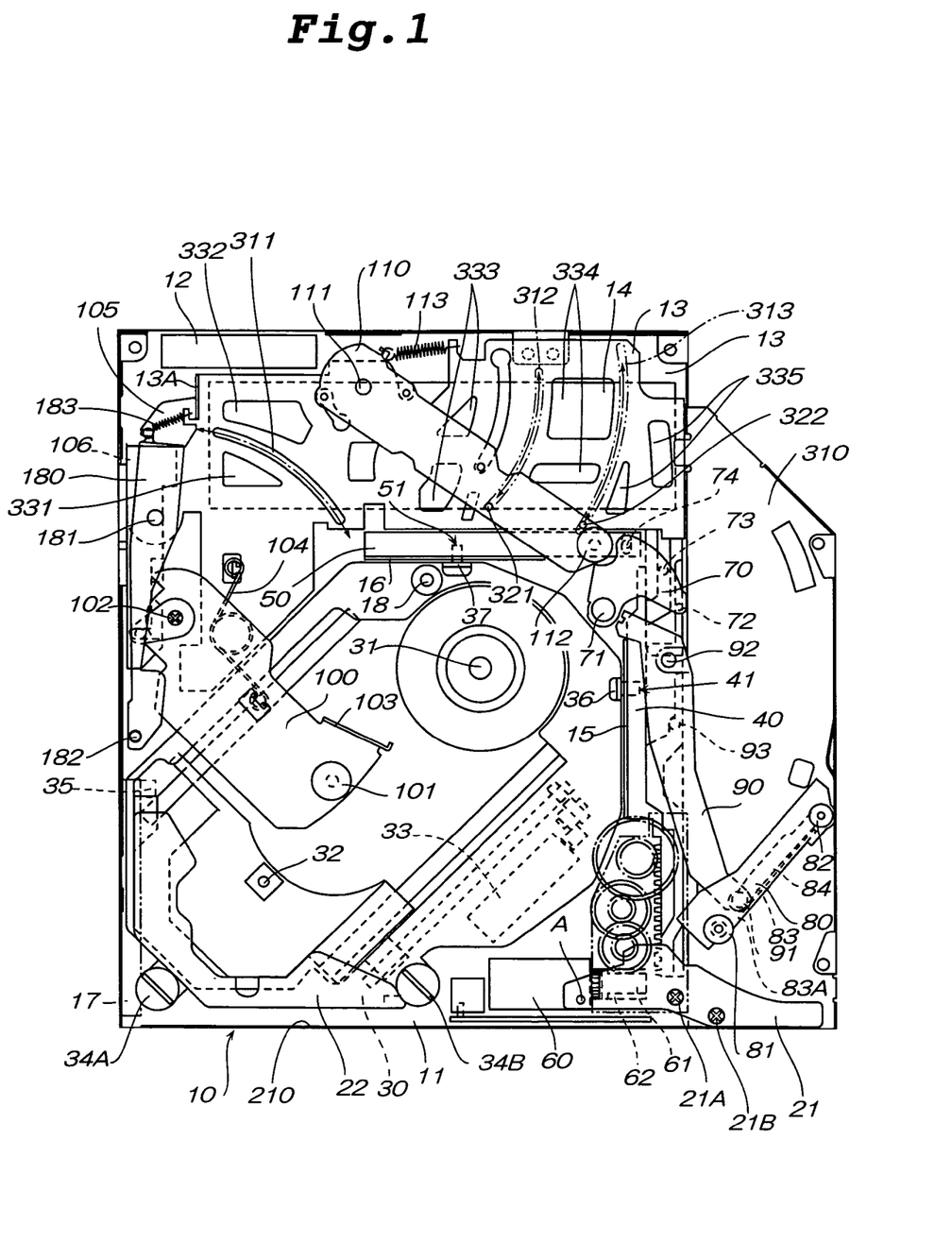
FIG. 1 is a plan view of an essential portion of a disk apparatus of an embodiment.
Figure 2:
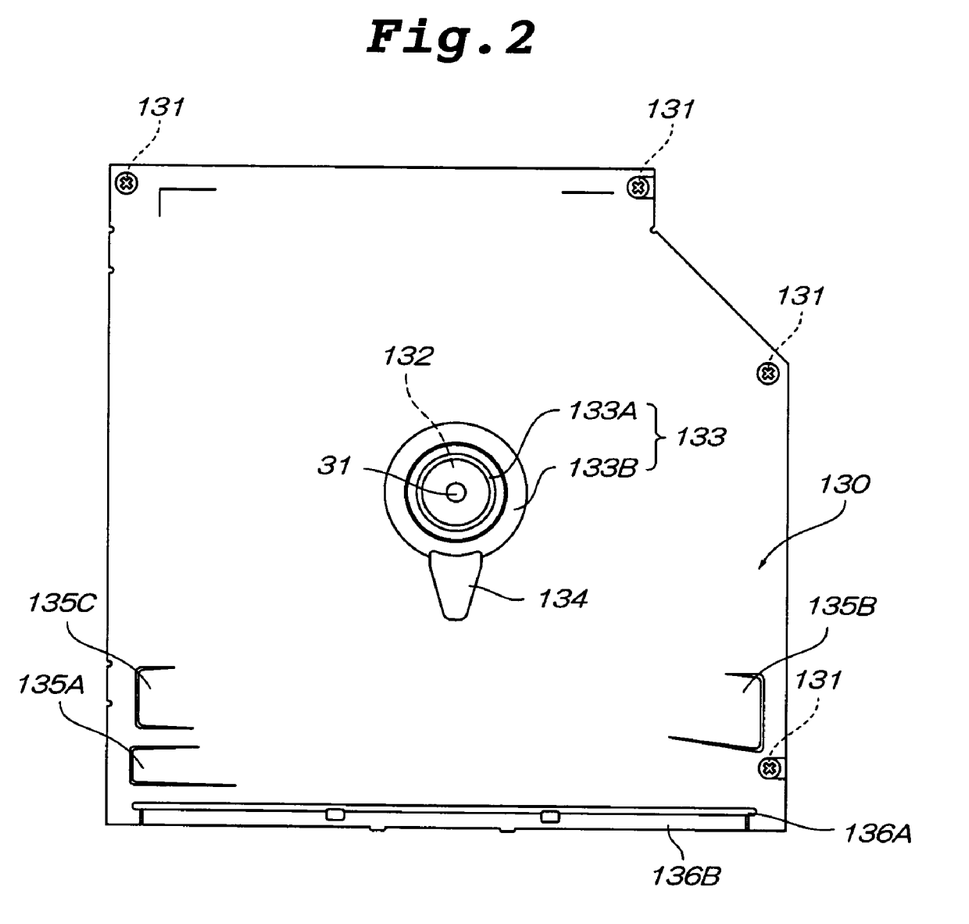
FIG. 2 is a plan view of the disk apparatus.
Figure 3:
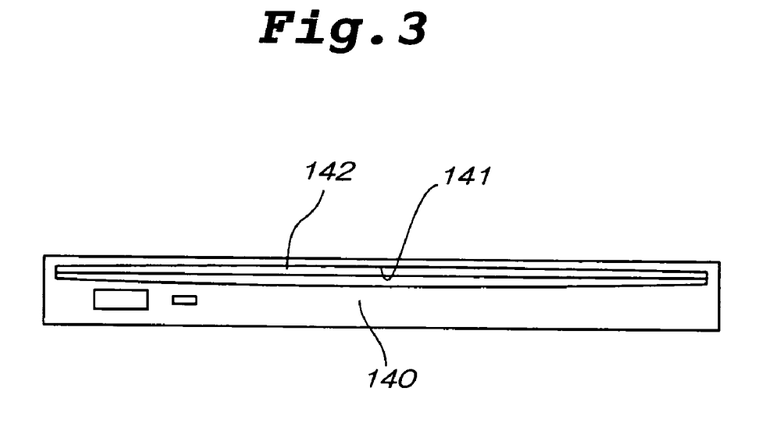
FIG. 3 is a front view of a bezel mounted on a front surface of a chassis outer sheath of the disk apparatus.
Figure 4:
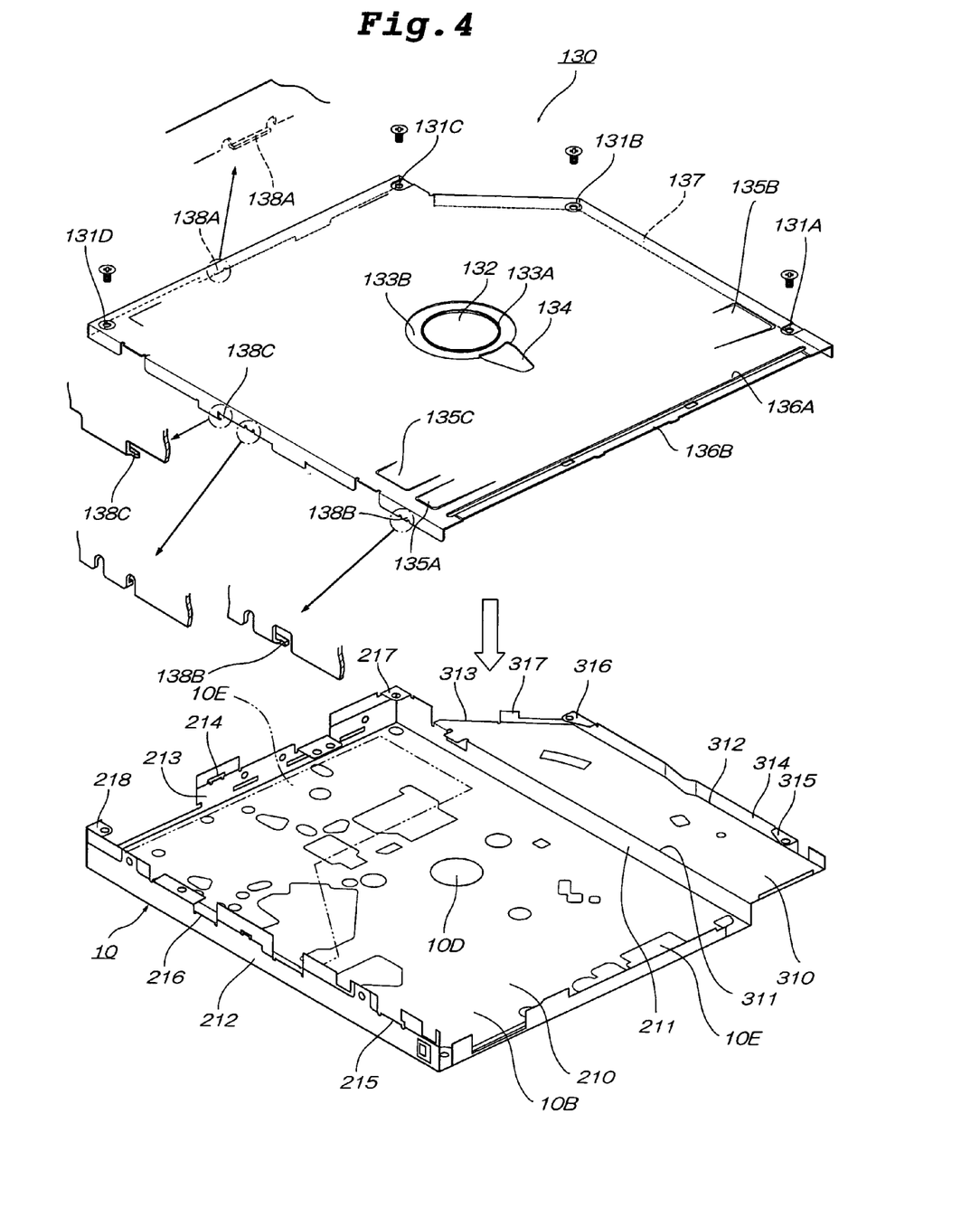
FIG. 4 is an exploded perspective view of the chassis outer sheath of the disk apparatus.
Figure 5:
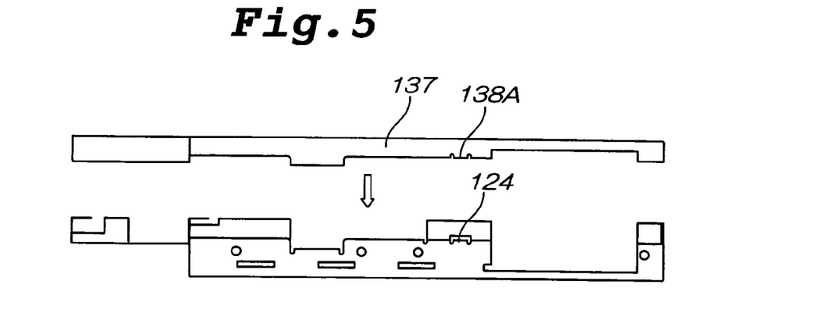
FIG. 5 is an exploded rear view of the chassis outer sheath of the disk apparatus.
Figure 6:
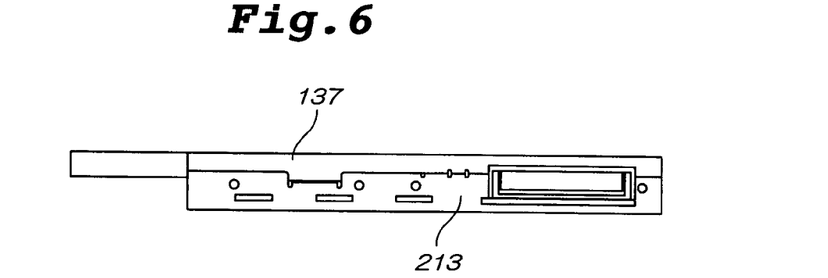
FIG. 6 is a rear view of the chassis outer sheath of the disk apparatus.
Figure 7:
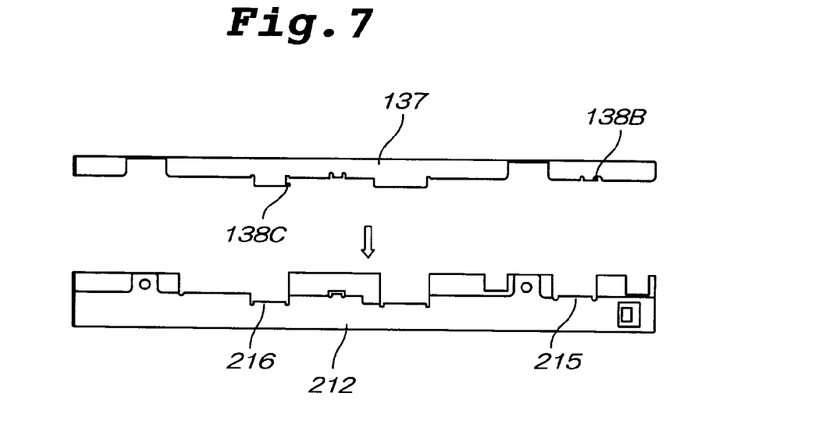
FIG. 7 is an exploded side view of the chassis outer sheath of the disk apparatus.
Figure 8:
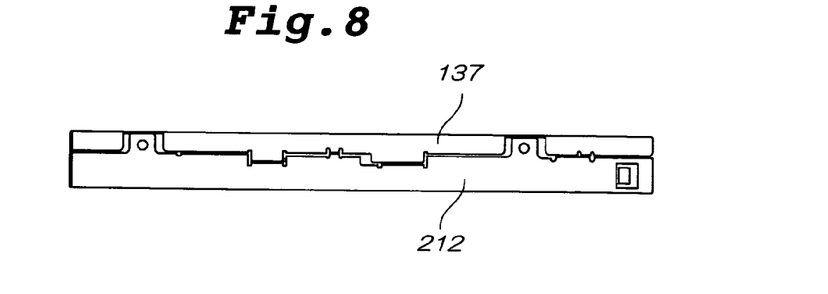
FIG. 8 is a side view of the chassis outer sheath of the disk apparatus.
Figure 9:
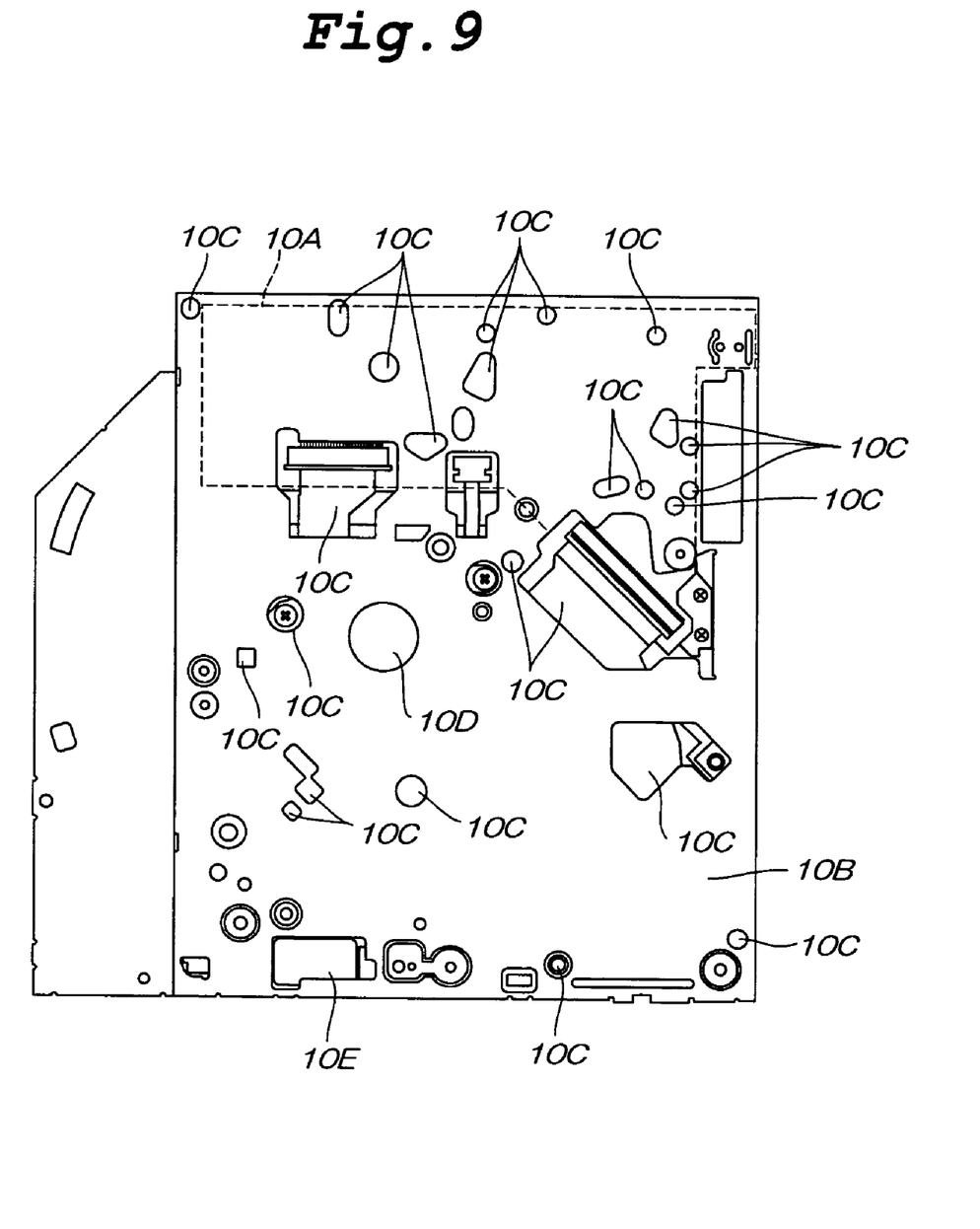
FIG. 9 is a plan view of a base body of the disk apparatus.

FIG. 1 is a plan view of an essential portion of a disk apparatus of an embodiment, FIG. 2 is a plan view of the disk apparatus, FIG. 3 is a front view of a bezel mounted on a front surface of a chassis outer sheath of the disk apparatus, FIG. 4 is an exploded perspective view of the chassis outer sheath of the disk apparatus, FIG. 5 is an exploded rear view of the chassis outer sheath of the disk apparatus, FIG. 6 is a rear view of the chassis outer sheath of the disk apparatus, FIG. 7 is an exploded side view of the chassis outer sheath of the disk apparatus, FIG. 8 is a side view of the chassis outer sheath of the disk apparatus, and FIG. 9 is a plan view of a base body of the disk apparatus.

The disk apparatus of this embodiment includes a chassis outer sheath comprising a base body and a lid. A bezel is mounted on a front surface of the chassis outer sheath. The disk apparatus of this embodiment is a slot-in type disk apparatus in which a disk is directly inserted from a disk inserting opening formed in the bezel shown in FIG. 3.

As shown in FIG. 1, various parts which perform recording/replaying function to and from a disk and a loading function of the disk are mounted on a base body 10.

The base body 10 is formed with a deep bottom 210 and a shallow bottom 310. A wing portion extending from a front surface to a rear surface is formed by the shallow bottom 310.

The base body 10 is formed at its front side with a disk inserting opening 11 into which a disk is directly inserted, and a connector 12 is disposed on an end of a rear surface of the base body 10. A traverse 30 is disposed on the base body 10 on the side of the disk inserting opening 11, and a rear base 13 is disposed on the base body 10 on the side of the connector 12. The traverse 30 and the rear base 13 are disposed such that they are not superposed on each other. A printed board 14 is provided on the rear base 13 on the side of a surface of the base body 10.

The rear base 13 is formed at its upper surface with a discharging lever sliding surface 311. The discharging lever sliding surface 311 projects along a turning direction of the discharging lever 100. The limiting lever 110 is formed at its lower surface with projections 321 and 322 which slide on an upper surface of the rear base 13. Limiting lever sliding surfaces 312 and 313 are formed on this upper surface of the rear base 13. The discharging lever 100 may be provided with a projection instead of providing the discharging lever sliding surface 311. The limiting lever sliding surfaces 312 and 313 may project instead of forming the projections 321 and 322 of the lower surface of the limiting lever 110.

A first opening 331 is provided in one of sides of the discharging lever sliding surface 311, and a second opening 332 is provided in the other side of the discharging lever sliding surface 311. A third opening 333 is provided in one of sides of the limiting lever sliding surface 312, and a fourth opening 334 is provided in the other side of the limiting lever sliding surface 312. A fourth opening 334 is provided in one of sides of the limiting lever sliding surface 313, and a fifth opening 335 is provided on the other side of the limiting lever sliding surface 313. In this manner, the openings 331 and 332 are formed in both sides of the discharging lever sliding surface 311, and openings 333, 334 and 335 are formed in both sides of the limiting lever sliding surfaces 312 and 313. With this, the rear base 13 can be reduced in weight without hindering the sliding motions of the discharging lever 100 and the limiting lever 110. It is preferable that the gross area of the openings 331, 332, 333, 334 and 335 is greater than a surface area of the rear base 13.

The traverse 30 holds a spindle motor 31, a pickup 32 and drive means 33 which moves the pickup 32. The spindle motor 31 is provided on one end of the traverse 30, and the pickup 32 is movably provided from one end to the other end of the traverse 30. When the pickup 32 is stopped, it is disposed on the other end side of the traverse 30. The drive means 33 includes a drive motor, a pair of rails on which the pickup 32 slides, and a gear mechanism for transmitting rotation of the drive motor to the pickup 32. The pair of rails are disposed on both sides such as to connect one end and the other end of the traverse 30. The drive motor is disposed such that a drive shaft is in parallel to the rails on the outer side of the rail on the side of disk inserting opening 11. The gear mechanism is disposed in a space between the drive motor and the rail on the side of the disk inserting opening 11.

In the traverse 30, the spindle motor 31 is located at a central portion of the base body 10, the reciprocating range of the pickup 32 is located closer to the disk inserting opening 11 than the spindle motor 31, and the reciprocating direction of the pickup 32 is different from the inserting direction of the disk. An angle formed between the reciprocating direction of the pickup 32 and the inserting direction of the disk is 40 to 45°.

The traverse 30 is supported on the base body 10 by a pair of insulators 34A and 34B.

It is preferable that the pair of insulators 34A and 34B are disposed closer to a stationary position of the pickup 32 than a position of the spindle motor 31, and closer to the position on the side of the disk inserting opening 11 than the stationary position of the pickup 32. In this embodiment, the insulator 34A is provided on the one end side in the vicinity of an inner side of the disk inserting opening 11, and the insulator 34B is provided on a central portion in the vicinity of the inner side of the disk inserting opening 11. The insulators 34A and 34B includes damper mechanisms made of resilient material. The insulators 34A and 34B can be displaced in a direction where the traverse 30 separates from the base body 10 by the damper mechanism.

A rib 35 is provided on a surface of the traverse 30 on the side of the base body 10. The rib 35 is provided on the side of a stationary position of the pickup 32 outside of the rails opposite from the disk inserting opening 11. The rib 35 has such a sufficient height that the rib 35 abuts against the base body 10 when the traverse 30 is brought close to the base body 10, the traverse 30 can displace in a direction where the traverse 30 separates from the base body 10 at the positions of the insulators 34A and 34B. Although the rib 35 is provided on the surface of the traverse 30 on the side of the base body 10 in this embodiment, the rid 35 may be provided on the surface of base body 10 on the side of the traverse 30. Further, the rib 35 may be provided on both of the surface of the traverse 30 on the side of the base body 10 and the surface of the base body 10 on the side of the traverse 30. Although the traverse 30 on the side of the insulators 34A and 34B rises utilizing the approaching motion of the traverse 30 toward the base body 10 in this embodiment, this can also be realized by another means which changes the height of the traverse 30 at the position of the insulators 34A and 34B, e.g., means which changes the height of the insulators 34A and 34B.

The traverse 30 operates to bring the spindle motor 31 close to and away from the base body 10 around the insulators 34A and 34B as fulcrums.

A main slider 40 and a sub-slider 50 which move the traverse 30 will be explained next.

Cam mechanisms displace the traverse 30. The main slider 40 and the sub-slider 50 are respectively provided with the cam mechanisms. The main slider 40 and the sub-slider 50 are disposed such that they are located on the side of the spindle motor 31. The main slider 40 is disposed such that its one end is located on the side of the front surface of the base body 10 and its other end is located on the rear surface of the base body 10. The sub-slider 50 is disposed in a direction perpendicular to the main slider 40 between the traverse 30 and the rear base 13.

The cam mechanism which displaces the traverse 30 comprises a first cam mechanism 41 and a second cam mechanism 51. The first cam mechanism 41 is provided on a surface of the main slider 40 on the side of the spindle motor 31, and the second cam mechanism 51 is provided on a surface of the sub-slider 50 on the side of the spindle motor 31.

A base member 15 is provided between the main slider 40 and the traverse 30, and a base member 16 is provided between the sub-slider 50 and the traverse 30. The base member 15 and the base member 16 are fixed to the base body 10, limit a position of the cam pin 36 of the traverse 30 by a vertical groove provided in the base member 15, and limit a position of a cam pin 37 of the traverse 30 by a vertical groove provided in the base member 16.

The base member 16 and the sub-slider 50 are connected to each other through a third cam mechanism (not shown in FIG. 1). The third cam mechanism has such a function that when the second cam mechanism 51 moves the traverse 30 away from the base body 10, the third cam mechanism moves the sub-slider 50 away from the base body 10.

A loading motor 60 is disposed on one end of the main slider 40. A drive shaft 61 of the loading motor 60 and one end of the main slider 40 are connected to each other through a gear mechanism. The drive shaft 61 of the loading motor 60 is provided with a worm gear 62 which constitutes the gear mechanism.

The loading motor 60 is disposed such that its main body is located at a central portion of the disk inserting opening 11 and the drive shaft 61 is located on the end of the disk inserting opening 11.

The drive shaft 61 of the loading motor 60 is inclined such that the drive shaft 61 comes close to a disk which is to be inserted into the disk inserting opening 11, and the disk inserting opening 11 of the main body of the loading motor 60 is inclined such as to come close to the disk. That is, the loading motor 60 is provided such that a position "A" shown in FIG. 1 most projects toward the lid. By inclining the loading motor 60 in this manner, even if a disk is inclined when it is to be taken out, an outer peripheral end of the disk is abutted against the position "A" of the main body of the loading motor 60, and it is possible to prevent an inner peripheral surface of the disk from abutting against the main body of the loading motor 60. The same effect can be obtained even if the loading motor 60 is inclined such that the drive shaft 61 thereof is inclined such as to come close to a disk to be inserted into the disk inserting opening 11 or the loading motor 60 is inclined such that the disk inserting opening 11 of the main body thereof is inclined such as to come close to the disk.

By driving the loading motor 60, the main slider 40 can slide in the longitudinal direction. The main slider 40 is connected to the sub-slider 50 through a cam lever 70.

The cam lever 70 includes a turning fulcrum 71, the cam lever 70 is engaged with a cam groove provided in an upper surface of the main slider 40 through a pin 72 and a pin 73, and the cam lever 70 is engaged with a cam groove provided in an upper surface of the sub-slider 50 through a pin 74.

The cam lever 70 has a function that the cam lever 70 moves the sub-slider 50 at timing at which the traverse 30 is displaced by the first cam mechanism 41 of the main slider 40, and the second cam mechanism 51 is moved by the movement of the sub-slider 50, thereby displacing the traverse 30.

The above explained connector 12, traverse 30, rear base 13, printed board 14, insulators 34A and 34B, main slider 40, sub-slider 50, base member 15, base member 16 and loading motor 60 are provided on the deep bottom 210 of the base body 10, and a disk-inserting space is formed between these members and the lid.

Next, a guide member for supporting a disk when the disk is inserted and a lever member which moves when the disk is inserted will be explained.

A first disk guide 17 having a predetermined length is provided on one end of the deep bottom 210 closer to the disk inserting opening 11. The first disk guide 17 has a groove. The groove has a U-shaped cross section as viewed from the disk inserting side. The disk is supported by this groove.

A pulling-in lever 80 is provided in the base body 10 on the other end side of the disk inserting opening 11. The pulling-in lever 80 is provided at its movable side end with a second disk guide 81. The second disk guide 81 comprises a cylindrical roller, and the second disk guide 81 is turnably provided on the movable side end of the pulling-in lever 80. A groove is formed in an outer periphery of the roller of the second disk guide 81, and the disk is supported in this groove.

The pulling-in lever 80 is disposed such that the movable side end is operated closer to the disk inserting opening 11 than the fixed side end, and the fixed side end is provided with a turning fulcrum 82.

A long groove 83 is provided between a movable side end and a fixed side end of a back surface (surface on the side of the base body 10) of the pulling-in lever 80. A third disk guide 84 having a predetermined length is provided between a movable side end and a fixed side end of a front surface of the pulling-in lever 80.

The pulling-in lever 80 is moved by the sub-lever 90.

The sub-lever 90 is provided at its one end on the movable side with a convex portion 91, and at its other end with a turning fulcrum 92. The convex portion 91 of the sub-lever 90 slides in a long groove 83 of the pulling-in lever 80. The turning fulcrum 92 of the sub-lever 90 is located on the main slider 40. The turning fulcrum 92 is not operated in association with the main slider 40, and is fixed to the base body 10 through the base member 15. A pin 93 is provided on a lower surface of the sub-lever 90 closer to the convex portion 91 than the turning fulcrum 92. The pin 93 slides in a cam groove provided in the upper surface of the main slider 40. Therefore, an angle of the sub-lever 90 is changed as the main slider 40 is moved, and the turning angle of the pulling-in lever 80 is changed by changing the angle of the sub-lever 90. That is, the second disk guide 81 of the pulling-in lever 80 is moved toward or away from the spindle motor 31 by the motion of the sub-lever 90. A groove 83A is provided in an end of the long groove 83 closer to the movable side end of the pulling-in lever 80. The groove 83A extends in the turning direction of the sub-lever 90. When the second disk guide 81 pulls the disk most inward by the groove 83A, even if the turning angle of the sub-lever 90 is varied, the turning angle of the pulling-in lever 80 is not varied, and a pulling amount of a disk can be stabilized.

A discharging lever 100 is provided on a side of the base body 10 different from the pulling-in lever 80. A guide 101 is provided on a movable side end of one end of the discharging lever 100. The discharging lever 100 is provided at its other end with a turning fulcrum 102. The discharging lever 100 is provided at its movable side end with an abutting portion 103. The abutting portion 103 is located closer to the rear surface than the guide 101. The discharging lever 100 is provided with a resilient body 104. One end of the resilient body 104 is fixed to the discharging lever 100, and the other end is fixed to the rear base 13. When the abutting portion 103 is pulled toward the rear surface by the resilient body 104, the abutting portion 103 abuts against an abutting portion 13A of the rear base 13. The discharging lever 100 is pulled out toward the disk inserting opening 11 by resilient force of the resilient body 104. The discharging lever 100 is operated in association with motion of the main slider 40 through the link arm 105 and the discharge slider 106. The link arm 105 connects the main slider 40 and the discharge slider 106 with each other, and the discharging lever 100 is engaged with a cam groove of the discharge slider 106 by a cam pin.

A limiting lever 110 is provided on the rear surface of the base body 10. An end of the limiting lever 110 close to the rear surface is a turning fulcrum 111. The limiting lever 110 is provided at its movable side end with a guide 112. The guide 112 of the limiting lever 110 is always biased such as to project toward the front side by a resilient body 113. The limiting lever 110 operates a limit switch at a predetermined position. That is, if a disk is inserted to a predetermined position, the limit switch is turned OFF, the loading motor 60 is driven and with this, the main slider 40 slides.

A guide lever 180 is provided on a side of the base body 10 on the same side as the discharging lever 100. A rear surface of the guide lever 180 is a turning fulcrum 181. The guide lever 180 is provided at its movable side with a guide 182. The guide 182 of the guide lever 180 is biased such as to project toward the disk by a resilient body 183. The guide lever 180 is operated in association with the main slider 40 through the link arm 105 and the discharge slider 106, and the guide 182 separates from the disk in accordance with motion of the main slider 40.

An opening is formed in the traverse 30 in the vicinity of the spindle motor 31. A pin 18 projecting from the base body 10 toward the lid is provided in the opening. In a state where the traverse 30 moves closest to the base body 10, the pin 18 has such a height that the pin 18 projects closer to the lid than the hub of the spindle motor 31. In a driven state of the spindle motor 31 (operating state where replaying and recording can be carried out), the traverse 30 has such a height that the traverse 30 is pulled closer to the base body 10 than the hub of the spindle motor 31. It is preferable that the pin 18 is located at a position corresponding to a non-recording surface of a center portion of a disk mounted on the spindle motor 31, and at a position away from the insulator 34 as compared with the spindle motor 31.

The base body 10 is provided at its front side with a front guider 21 and a traverse felt 22. The front guider 21 is disposed on the side of one end of the disk inserting opening 11 and between the pulling-in lever 80 and the disk inserting opening 11. The front guider 21 is provided such as to cover portions of the loading motor 60, the gear mechanism and the main slider 40. The front guider 21 is provided closer to the lid than these members. The periphery of the front guider 21 is tapered so that the entire recording surface of a disk to be inserted does not come into contact with the front guider 21, and the surface is coated with urethane fluorine. The front guider 21 is fastened to the deep bottom 210 by means of a screw 21A, and is fastened to the shallow bottom 310 by means of a screw 21B. By fastening the front guider 21 to the deep bottom 210 and the shallow bottom 310 by means of the screws 21A and 21B in this manner, it is possible to prevent the shallow bottom 310 from being deformed.

The traverse felt 22 is provided on the other end of the disk inserting opening 11. That is, the traverse felt 22 is provided closer to the lid than the traverse 30 such that the traverse felt 22 covers a portion of the disk inserting opening 11 of the traverse 30. A central portion of the traverse felt 22 is projected so that the entire recording surface of a disk to be inserted does not come into contact with the traverse felt 22, and the traverse felt 22 is made of felt material. When a disk can not sufficiently be supported by the first disk guide 17 or second disk guide 81, the front guider 21 and the traverse felt 22 can prevent the recording surface from being damaged by inclination toward the surface of the disk. The front guider 21 may be made of felt material, and the traverse felt 22 may be coated with urethane fluorine.

Next, the lid of the disk apparatus will be explained using FIG. 2.

The lid 130 is provided at its outer edge with a plurality of screw holes 131, and the lid 130 is mounted on the base body 10 through screws.

The lid 130 is provided at its central portion with an opening 132. The opening 132 is a circular opening having a radius greater than a center hold of a disk. Therefore, the opening 132 is greater than the hub of the spindle motor 31 which is fitted into the center hold of the disk.

The opening 132 is formed at its outer periphery with a ring-like narrowed portion 133 which projects toward the base body 10. The ring-like narrowed portion 133 comprises a first ring-like narrowed portion 133A provided on an outer periphery of the opening 132, and a second ring-like narrowed portion 133B provided on an outer periphery of the first ring-like narrowed portion 133A. A projecting height of the first ring-like narrowed portion 133A is higher than a projecting height of the second ring-like narrowed portion 133B. A width of the second ring-like narrowed portion 133B in its radial direction is greater than a width of the first ring-like narrowed portion 133A in its radial direction. In this manner, the rigidity of the lid 130 against the bending can be enhanced by these two ring-like narrowed portions 133A and 133B, and even if the lid 130 is deformed when a disk is chucked, since the first ring-like narrowed portion 133A is higher than the second ring-like narrowed portion 133B, the first ring-like narrowed portion 133A reliably presses the disk, and stable chucking motion can be carried out. The opening 132 is provided with a narrow portion 134 which is tapered from the narrowed portion 133 toward the disk inserting opening 11. A convex guide is formed on the base body 10 by this narrow portion 134.

The lid 130 is formed with a plurality of narrowed portions 135A, 135B and 135C. The base body 10 is formed with a convex guide by these narrowed portions 135A, 135B and 135C.

The lid 130 is formed at its end close to the front surface with a first narrow groove 136A and a second narrow groove 136B. The first narrow groove 136A is adjacent to the second narrow groove 136B. The first narrow groove 136A has a predetermined length projecting toward the base body 10. The second narrow groove 136B has a predetermined length projecting toward the opposite side from the first narrow groove 136A. The first narrow groove 136A and the second narrow groove 136B are grooves which are continuous having a length corresponding to a width of a disk. The first narrow groove 136A becomes gradually higher from its center toward its end.

These narrowed portions 135A, 135B and 135C and the narrow grooves 136A and 136B are provided on the outer side from an outer peripheral end of a disk mounted on the spindle motor 31 and closer to the disk inserting opening 11 than the opening 132. A disk inserted from the disk inserting opening 11 is guided by convex guides formed by the narrowed portions 135A, 135B and 135C and the narrow groove 136A. These narrowed portions 133, 134, 135A, 135B, 135C and the narrow grooves 136A and 136B enhances the strength of the lid 130. The narrowed portion 135B and the narrowed portion 135C may be continuous one narrowed portion, but if it is divided into a plurality of portions, the strength of the lid 130 can further be enhanced.

In this embodiment, the first narrow groove 136A having the predetermined length and the second narrow groove 136B having the predetermined length projecting toward the opposite side from the first narrow groove 136A are formed on the end of the lid 130 having no sidewall closer to the front surface. With this, rigidity of the lid 130 against the bending of the end on the side of the front surface can be enhanced. By enhancing the rigidity against the bending, it is possible to stably carry out the chucking motion. In this embodiment, by increasing the height of the end of the first narrow groove 136A higher than the center thereof, it is possible to enhance the rigidity against the bending as compared with a case where a groove of the same height is formed, and to guide the disk through opposite ends of the first narrow groove 136A when the disk is inserted or discharged and thus, smooth motion can be carried out without damaging the recording surface of the disk.

Aluminum alloy or magnesium alloy is used for the lid 130, and the entire inner peripheral surface of the lid 130 is coated with fluorine system compounding urethane beads. Only a contact surface of the narrowed portion 133 with respect to the disk may be coated. A preferable coating material includes urethane resin compounding beads of 20μ diameter in which 5% fluorine and 1.0 to 1.5% silicon are mixed therein. It is preferable that the coefficient of friction of the coating material is 0.2 to 0.6, and more preferably 0.55 or less.

Next, the bezel will be explained using FIG. 3.

A bezel 140 is provided with an inserting opening 141. A central portion of the inserting opening 141 has the widest width, and the width is reduced toward the ends. A felt 142 having a notch is pasted on a surface of the bezel 140 on the side of the chassis outer sheath along the inserting opening 141. The felt 142 is bent in the direction of travel when a disk is mounted from the inserting opening 141 or when a disk is discharged from the inserting opening 141.

Next, the chassis outer sheath will be explained using FIGS. 4 to 9.

The base body 10 is formed with the deep bottom 210 and the shallow bottom 310. The deep bottom 210 comprises a sidewall 211 on the side of the shallow bottom 310, a sidewall 212 on the opposed side which is not connected to the shallow bottom 310, and a sidewall 213 on the side of the rear surface. The shallow bottom 310 comprises a connection end 311 connected to the sidewall 211 on the side of the deep bottom 210, an opposed end 312 which is not connected to the deep bottom 210, and an inclined end 313 which is adjacent to the connection end 311 and the opposed end 312.

As shown in FIGS. 4 and 5, the deep bottom 210 is formed with a plurality of openings 10C. If the deep bottom 210 is divided into a first base body region 10A where a printed board is disposed and a second base body region 10B where the printed board is not displaced, the openings 10C are formed such that a gross area of the openings 10C provided in the first base body region 10A is greater than a gross area of the openings 10C provided in the second base body region 10B. By reducing the openings 10C in the second base body region 10B, it is possible to prevent dust from entering the pickup 32, and to reduce the base body 10 in weight. The base body 10 is formed with an opening 10D at a position of the spindle motor 31, and with an opening 10E at a position of the loading motor 60.

In the deep bottom 210, a hook receiving opening 214 is provided on the side of the central portion of the sidewall 213, a hook receiving opening 215 is provided on the side of a front portion of the sidewall 212, and a hook receiving opening 216 is provided on the side of a rear portion of the sidewall 212. Connection pieces 217 and 218 which are in parallel to the surface of the deep bottom 210 are formed on the opposite ends of the sidewall 213.

In the shallow bottom 310, a rising portion 314 extending toward the lid 130 is formed on the opposed end 312, and connection pieces 315 and 316 extending toward the deep bottom 210 are formed on an upper end of the rising portion 314. The connection piece 315 is provided on the side of the front surface of the opposed end 312. The connection piece 316 is provided on an end of the opposed end 312 connected to the inclined end 313. A portion of the inclined end 313 is formed with a rising portion 317 which abuts against the lid 130.

A wall 137 is formed on another end of the lid 130 except the front surface thereof. A central portion of the wall 137 on the side of the rear surface is provided with a hook 138A at a location corresponding to the hook receiving opening 214. Hooks 138B and 138C are provided on a sidewall 137 of the lid 130 on the side of the deep bottom 210. The hooks 138B and 138C engage with hook receiving openings 215 and 216 of the sidewall 212 of the base body 10. Here, an end of the hook 138A is bent toward a center of the base body 10 (on the side of the front surface). Ends of the hooks 138B and 138C are bent toward the center of the base body 10, and projections of the hooks 138B and 138C are also formed on the side of the front surface. It is preferable that a hook formed by bending an end toward the center of the base body 10 is further provided between the hooks 138B and 138C as shown in the drawing.

In the above structure, the connection piece 315 and the screw hole 131A are connected to each other through a screw, the connection piece 316 and the screw hole 131B are connected to each other through a screw, and a connection piece 217 and a screw hole 131C are connected to each other through a screw. Wit this, the rigidity of the shallow bottom 310 can be enhanced. The rigidity of the shallow bottom 310 can further be enhanced by the rising portion 317 of the inclined end 313.

The hook 138A is engaged with the hook receiving opening 214, the hook 138B is engaged with the hook receiving opening 215 and the hook 138C is engaged with the hook receiving opening 216. With this, it is possible to prevent the lid 130 from floating at the time of chucking. Especially, since the hooks 138B and 138C are formed with the bending toward the center of the base body 10 and projections toward the front surface, the lid 130 and the sidewall 212 can strongly be fastened to each other.

INDUSTRIAL APPLICABILITY

The disk apparatus of the embodiment is especially effective as a disk apparatus which is incorporated in a so-called notebook personal computer in which display means, input means, processing means and the like are integrally provided.

The invention claimed is:

1. A disk apparatus comprising a chassis outer sheath having a base body and a lid, in which a front surface of said chassis outer sheath is formed with a disk inserting opening into which a disk is directly inserted, a connector is disposed on a rear surface of said chassis outer sheath, a traverse is disposed on the side of said disk inserting opening, a printed board is disposed on the side of said connector, said traverse holds a spindle motor, a pickup and drive means which moves said pickup, said spindle motor is disposed at a central portion of said base body, a discharging lever which discharges a disk is provided on a side of said base body, a limiting lever which limits insertion of the disk is provided on the side of a rear surface of said base body, and a rear base is provided at a location which is not superposed on said traverse and at a location covering said printed board, wherein one of a lower surface of said discharging lever and an upper surface of said rear base is projected to form a discharging lever sliding surface on said rear base, one of a lower surface of said limiting lever and the upper surface of said rear base is projected to form a limiting lever sliding surface on said rear base, a plurality of openings are formed in said rear base, and said openings are formed on opposite sides of said discharging lever sliding surface, and said openings are also formed on opposite sides of said limiting lever sliding surface.

2. The disk apparatus according to claim 1, wherein said openings are formed such that a gross area of said openings is greater than a surface area of said rear base.

3. The disk apparatus according to claim 1, wherein said base body is formed with a plurality of openings.

4. The disk apparatus according to claim 3, wherein said openings of said base body are formed at a location of said spindle motor.

5. The disk apparatus according to claim 3, wherein said openings are formed such that a gross area of said openings provided in a base body region where said printed board of said base body is disposed is greater than a gross area of said openings provided in the base body region where said printed board of said base body is not disposed.

6. The disk apparatus according to claim 1, wherein
said base body is formed with a deep bottom and a shallow bottom,
said shallow bottom is disposed on a side of said deep bottom,
said shallow bottom includes a connection end which is connected to said deep bottom, an opposed end which is not connected to said deep bottom, and an inclined end which is adjacent to said connection end and said opposed end,
said opposed end is formed with a rising portion extending toward said lid,
a plurality of shallow bottom side connection pieces extending toward said deep bottom are formed on an upper end of said rising portion,
one of said shallow bottom side connection pieces is provided on an end of an opposed end which is connected to said inclined end,
said base body and said lid are fastened to each other by said shallow bottom side connection piece
a plurality of deep bottom side connection pieces which are parallel to a surface of said deep bottom are formed on an upper end of a sidewall of said deep bottom on the side of its rear surface,
one of said deep bottom side connection pieces is provided on a corner on the side of said shallow bottom, and
said base body and said lid are fastened to each other by said deep bottom side connection piece.

7. The disk apparatus according to claim 1, wherein a hook which engages the sidewall of said base body on the side of its rear surface is provided on a central portion of the sidewall of said lid on the side of the rear surface, and another hook which engages the sidewall of said base body is provided on a sidewall of said lid on the side of said deep bottom.

* * * * *